March 17, 1970     J. E. AYERS     3,501,392
ELECTROMOTIVE SENSING DEVICE

Filed June 28, 1967     2 Sheets-Sheet 1

INVENTOR.
James E. Ayers
BY
Griswold & Burdick
ATTORNEYS

March 17, 1970 J. E. AYERS 3,501,392
ELECTROMOTIVE SENSING DEVICE
Filed June 28, 1967 2 Sheets-Sheet 2

INVENTOR.
James E. Ayers
BY
Griswold & Burdick
ATTORNEYS

United States Patent Office 3,501,392
Patented Mar. 17, 1970

3,501,392
ELECTROMOTIVE SENSING DEVICE
James E. Ayers, St. Louis, Mich., assignor to The Dow Chemical Company, Midland, Mich., a corporation of Delaware
Filed June 28, 1967, Ser. No. 649,521
Int. Cl. B01k 3/00
U.S. Cl. 204—195     2 Claims

ABSTRACT OF THE DISCLOSURE

An electromotive sensing device comprising two electrodes engaged in the walls of a washer shaped support member, the reference electrode characterized in that the electrode cap is jacketed with a substantially inert material. An improved method of automatically controlling chemical processes by placing the electromotive sensing device in a chemical process stream containing species which exhibit electrical potential responses; detecting the oxidation-reduction potential created by the oxidation-reduction response of the system, and automatically controlling the ratio of reactants in accordance therewith.

BACKGROUND OF THE INVENTION

Chemical reactions in systems containing species which exhibit electrical potential responses such as systems wherein one species undergoes reduction while a second undergoes oxidation, commonly referred to as a redox system, are frequently amenable to automatic control by measuring the electrical potentials created in such systems. Exemplary of such chemical processes involving oxidation-reduction responses are the production of hypochlorite bleach and the bleaching of paper pulp. Additionally, other processes wherein oxidation-reduction responses occur, such as the treatment of water and waste materials, can also be automatically controlled through the use of electrical potential measuring devices. Electromotive sensing devices, usually in the form of potential measuring cells, have heretofore generally been constructed of a reference electrode having an electroconductive surface such as, for example, a calomel electrode or a silver electrode, and a measuring electrode having an electroconductive surface usually constructed of platinum. These cells are quite adequate under laboratory conditions but when used in chemical processes of a larger commercial scale they are found to be subject to many inherent disadvantages. The calomel electrodes are usually constructed of glass and therefore are not adequate for the tremendous chemical and physical stresses involved in larger commercial processes. For this reason, the calomel electrode has usually been replaced with an electrode constructed of a noble metal such as, for example, silver. However, silver electrodes are usually quickly eroded when employed in process streams which have erosive characteristics due to the velocity of the process stream, suspended solids in the stream, and general erosive characteristics of the chemicals specifically involved in the process system. Therefore, they are found to have a short life span under commercial process conditions and create costly maintenance and shutdown problems because of the need for frequent replacement of the electrodes. To help increase the life span of the electrodes and to facilitate ease of replacement, oxidation-reduction and other like electrical response measurements usually have, heretofore, been made by diverting sample side streams or by taking aliquot samples from the process stream. The diversion of samples from the main reaction stream creates additional disadvantages which are associated with the necessary increased lag time between the monitoring point and the control point in the system. Increasing the lag time interferes with process control, thus creating unnecessary waste of raw materials and the production of products which are not uniform in quality. For example, in hypochlorite bleach production the reaction of chlorine and caustic proceeds quite rapidly and therefore in continuous processes it is important to keep the lag time to a minimum.

The present novel electromotive sensing device eliminates the need for diverting samples from the reaction zone thereby cutting down on costly lag time, and also increases the life span of the electrodes used therein. Furthermore, because of its novel design, the time required to replace worn electrodes is cut to a minimum. Thus, most of the serious disadvantages associated heretofore with the control of chemical processes based on electromotive responses have been eliminated.

SUMMARY OF THE INVENTION

The present invention comprises a novel device and method for monitoring electromotive forces created in many chemical systems. The device consists of a washer shaped support member having two electrode assemblies positioned therein which is placed in the immediate chemical process zone or stream. The reference electrode assembly is characterized in that the electroconductive surface is jacketed with a substantially inert material, affixed in such a manner as to expose a portion of said surface, thus substantially increasing the useful life span of the electrode surface.

It is a principal object of the invention to provide an apparatus and method for automatically controlling chemical processes under adverse conditions of temperature, pressure and velocities while maintaining minimum shutdown and lag time and minimum fabrication cost.

It is also an object to provide an apparatus and method which affords precise control of chemical processes without any detrimental lag time, thereby allowing maximum raw material utilization and uniform products.

These and other objects and advantages will become readily apparent from a reading of the following specification in light of the appended drawings wherein:

DESCRIPTION OF THE PREFERRED EMBODIMENTS

Figure 1:
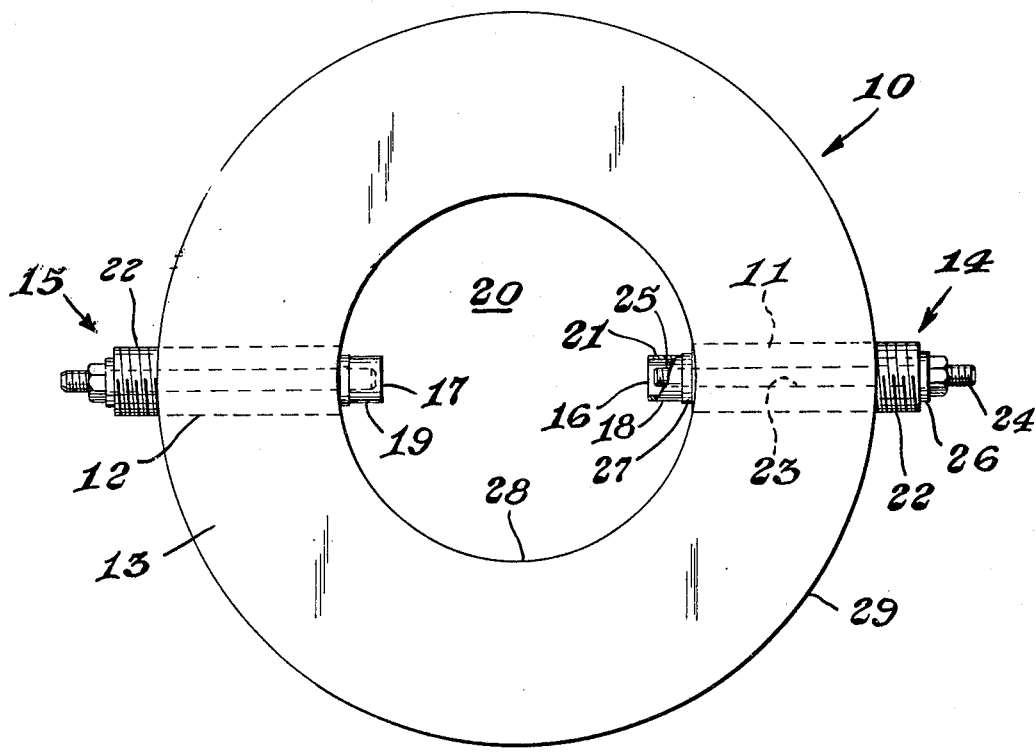
FIGURE 1 represents, partly in section, one embodiment of the present electromotive sensing device.

One embodiment of the present novel device is depicted in FIGURE 1. It comprises a washer shaped support member 10, having two spaced apart threaded bores 11 and 12, extending entirely through the wall 13 of the support member 10. A reference electrode assembly 14 and an anode electrode assembly 15 are each threadably engaged in the threaded bores 11 and 12 such that the reference faces 16 and 17 of electroconductive electrode caps 18 and 19 are not touching each other and are exposed to the inner chamber 20 of the support member 10. The opposite ends of the electrode assemblies 14 and 15 extend outside the support body 10 and are electrically connected to an electromotive force indicating device (not shown). The reference electrode assembly 14 is usually further characterized by the fact that it has a chemical and erosive resistant open end jacket 21 affixed to the electrode cap 18 of the reference electrode assembly 14 exposing the reference face 16 of the cap.

Figure 2:
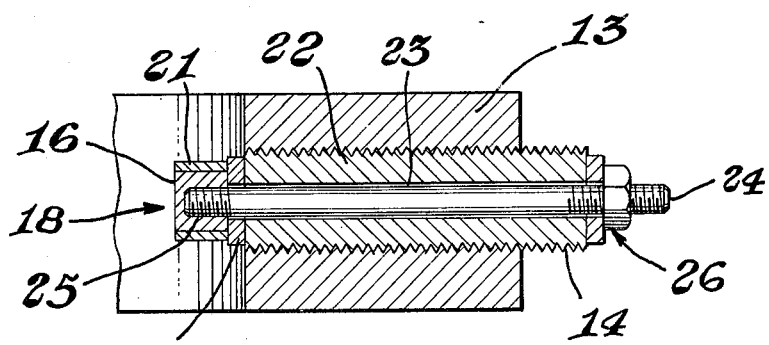
FIGURE 2 in sectional view represents one embodiment of a novel reference electrode assembly which can be used in the electromotive sensing device.

One embodiment of a reference electrode assembly 14 which may be used in the present invention is depicted in detail in FIGURE 2. This assembly comprises a resilient tubular insert member 22 threaded about its entire periphery so as to internally engage the threaded bore 11 in the support member 10. It is also provided with a smooth bore 23 axially positioned therein and extending entirely therethrough.

The electrode assembly 14 additionally comprises an electroconductive rod 24 having an outside diameter slightly less than the bore 23 provided in the insert member 22. The electroconductive rod is threaded at each end, one end threaded so as to mate with the blind threaded bore 25 of the reference electrode cap 18 having a chemical and erosive open end jacket 21 about its periphery exposing the reference face 16 of the electroconductive electrode cap 18. The other end of the electroconductive rod engages a nut and washer assembly 26. The electrode assembly 14 also consists of a chemical and erosive resistant washer 27 having a bore approximately the same size as that of the smooth bore 23 in the insert member 22. The anode electrode is constructed in a like manner but usually does not include a chemical and erosive resistant jacket 21 about the electrode cap 19. This can be used, however, if desired.

In assembling the electromotive sensing device, the threaded insert member 22 of the reference electrode assembly 14, for example, is usually engaged in the threaded bore 11, of the support member 10 so that one end of the insert member 22 is flush with the inner face 28 of the support member 10. The electroconductive rod 24 is inserted through the smooth bore 23 of the insert member 22, and the electrode cap 18 having a resistant jacket 21, is threaded thereto with the chemical resistant washer 27 separating the electrode cap 18 from the face of the insert member 22. The nut and washer assembly 26 is engaged to the electroconductive rod 24 on the end protruding from the outside face 29 of the support member 10, and is drawn up so as to expand the resilient insert member 22 in the threaded bore 11, thereby providing a gas and liquid tight seal. The end of the electroconductive rod 24 fitted with the nut and washer assembly 26 is electrically connected to an electromotive measuring device (not shown).

The anode electrode assembly 15 is assembled in a manner similar to that described herein for the reference electrode assembly 14. However, since the anode electrode cap 20 is usually constructed of platinum, the chemical resistant jacket normally is not required, although, as indicated hereinbefore, such a jacket optionally can be used, if desired.

It is appreciated that the size and general shape of the assembled electromotive sensing device can be varied in accordance with the particular needs of individual chemical process systems and various modifications may be made in the support member 10 to meet specific requirements without departing from the novel invention described herein.

Figure 3:
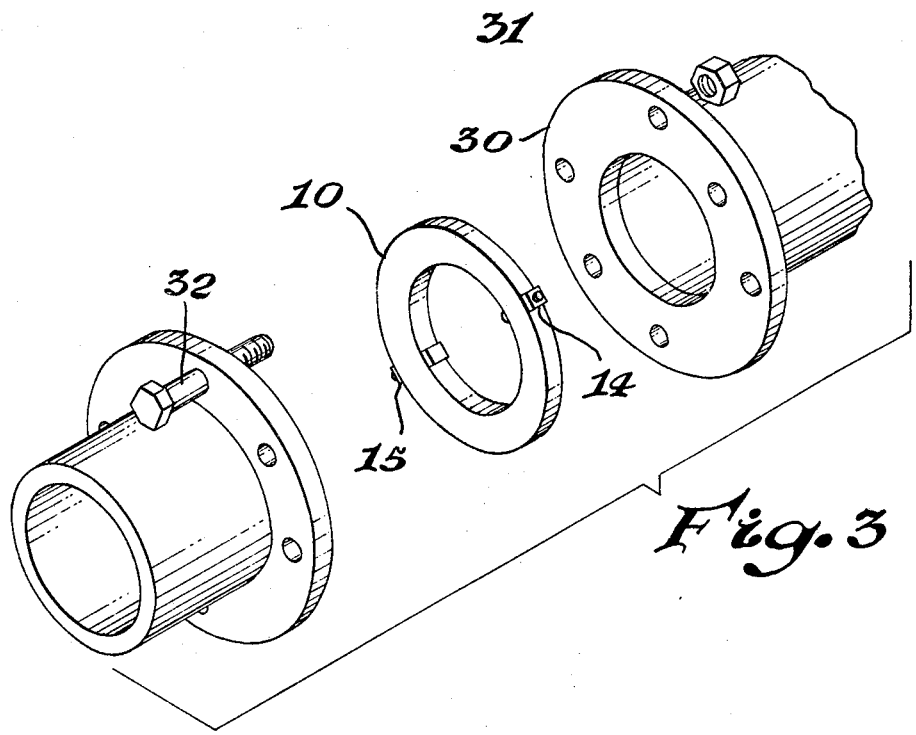
FIGURE 3 represents an exploded view of the novel electromotive sensing device as assembled in a transportation means or reaction chamber.

The novel device is usually mounted in a process stream in a manner similar to that illustrated in FIGURE 3. The washer shaped support member 10 fitted with electrode assemblies 14 and 15, as described hereinbefore, is placed between the flanges 30 of a transportation means or chemical reaction chamber 31 and the flanges 30 tightly drawn up by nut and bolt assemblies 32 to contain the support member 10 and provide a liquid and gas tight connection. The inside diameter of the support member 10 is usually the same as the inside diameter of the transportation means 31 so as not to restrict the flow of the process stream. One novel feature of the present device is that it can be varied in size to fit most chemical process systems. Because of the ease of installation, shutdown time is kept to a minimum.

Figure 4:
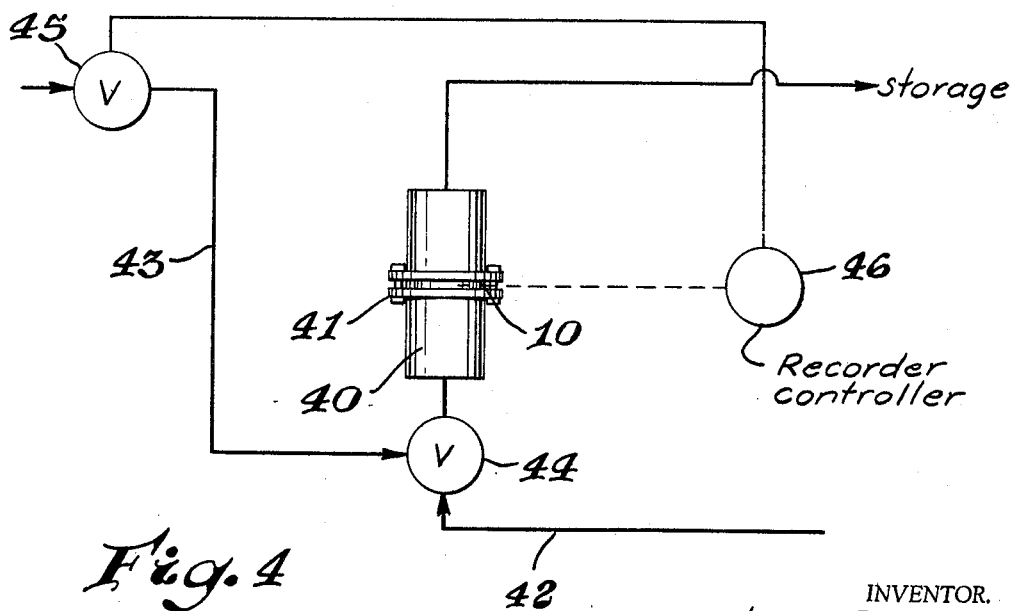
FIGURE 4 schematically represents the incorporation of the sensing device in a chemical process system for automatically controlling the progress of the chemical process.

The walls of a reaction chamber or of a transportation means to or from a reaction chamber may be utilized to support the novel electromotive sensing device. When the novel device is mounted in either manner, the electrodes can be incorporated into a system as depicted in FIGURE 4 whereby automatic control of a chemical process can be achieved. The system shown consists of a reaction chamber 40 having the washer shaped support member 10 with the electrode assembly as described hereinbefore positioned thereon, mounted directly between flanges 41 contained in said chamber. The reaction chamber is adapted to raw material feed lines, depicted schematically as 42 and 43, which are connected to raw material supply reservoirs, not shown. The raw material feed lines are provided with flow control means, e.g. valves, 44 and 45. The electromotive sensing device is electrically connected to an electromotive sensing and control means 46, such as, for example, an oxidation-reduction potential recorder controller which in turn controls at least one of the control means 44 or 45.

The materials of construction of the electromotive sensing device will usually depend on the type of chemical process involved and the particular chemical species which will come in contact with the device.

To insure a gas and liquid tight seal between the sides of the bores 11 and 12 in the support member 10 and the electrode assemblies 14 and 15, the resilient insert member 22 is usually manufactured from a material which will yield slightly when the nut and washer assembly 26 is drawn tight on the electroconductive rod 24. Generally in commercial processes the chemical species are of such a corrosive nature that a highly polymerized fluorohydrocarbon such as polytetrafluoroethylene is preferred. Other materials such as hard rubber, polyethylene and the like may be employed. It is preferred that the insert member be engaged in a threaded bore in the support member 10, however, where excessive pressures are not encountered smooth bores or other restraining type bores, such as, for example countersunk bores may be employed.

The material of construction of the reference electrode cap 18 varies with the nature of the fluids it contacts. In the presence of halogen and caustic the reference cap 18 is preferably constructed of a noble metal such as, for example, silver, with the protective jacket 21 being manufactured of a chemical resistant material such as, for example, titanium. The jacket about the noble metal cap in the present device can be constructed of other chemical resistant materials such as, for example, nickel, stainless steel, iron, polytetrafluoroethylene, epoxides, ceramics and other like materials which are substantially inert to the particular chemical species in the chemical system. The anode cap 19 is usually constructed of platinum and therefore does not usually require a protective jacket.

The material of construction of the electroconductive rod 24 is not critical, other than it be readily electroconductive. Aluminum alloys, brass, silver alloys and other like electroconductive materials may be employed.

The nut and washer assembly 26 is usually constructed of the same material as is the electroconductive rod 24 while the washer 27, which is in contact with the chemical reactants and reactant products, is usually constructed of a material which is substantially inert to the fluids it comes in contact with. Teflon, polytetrafluoroethylene, polyfluoroethylene, polyvinyl chlorides, various epoxy resins and polyester resins, and other synthetic materials may be used.

The material of construction of the washer shaped support member 10 depends upon the corrosive nature of the reactants and reaction products and also upon the pressures, velocities, and temperatures encountered in the chemical process systems at the location of the electrodes. Stainless steel, polytetrafluoroethylene, polypropylene lined metals and other synthetic construction materials may be employed.

The novel electromotive sensing device allows the monitoring of oxidation-reduction potentials, pH measurements and other electromotive force measurements indicative of the state of chemical systems directly in the reaction masses and process streams without the necessity of diverting samples from the reaction zone. This allows more accurate readings because of a shorter lag time between the reaction and the monitoring, thus insuring a more efficient and accurate control of chemical process systems. For example, in the production of chloride bleach careful automatic control of the reaction process can be facilitated by use of the apparatus herein described.

In the actual operation of a chemical process, such as, for example, the production of hypochlorite bleach, an oxidation-reduction potential or pH reading is predetermined for a desired ratio of reactants or species present in the reaction mixture. The recorder controller 46 is set to monitor the actual oxidation-reduction potential created in a given chemical system and in turn controls the introduction of the raw materials into the reaction chamber so that a predetermined oxidation-reduction potential is maintained. In a continuous type chemical process, such as, for example, the preparation of sodium hypochlorite bleach from caustic and chlorine, the excess of caustic to chlorine in the final product can be accurately controlled by supplying a constant stream of chlorine and automatically controlling the amount of caustic introduced into the reaction zone. Preferably caustic is introduced at a predetermined constant rate and the introduction of chlorine is controlled so as to maintain a predetermined oxidation-reduction potential. By varying the chlorine supply so as to hold a constant predetermined electrical potential, it is possible to produce bleach solutions having a constant degree of excess alkalinity.

The operation can be varied somewhat to accommodate batch type operations wherein instead of automatically controlling the introduction of raw materials into the reaction zone on a continuous basis, the sensing device can be incorporated into the system so as to shutdown the reaction process when a predetermined pH or oxidation-reduction potential is monitored in the reaction zone indicating that the reaction is complete.

The present automatic control method is an improvement over those already in use in that the design of the novel electromotive sensing device, as described hereinbefore, permits the monitoring of a chemical process system at any desired point in the system including in the immediate reaction zone, or within any prescribed time interval before or after the reacton point. As stated previously, this allows precise control of the lag time between the desired monitoring point and the actual monitoring. Therefore, more precise control of the chemical process is achieved by the use of the present novel electromotive sensing device and method of control. The method and apparatus guarantees a more uniform product with maximum stability and substantial savings in raw materials.

I claim:
1. An electromotive sensing device which comprises:
(a) a chemical and erosive resistant washer shaped support member having two bores spaced apart in the walls thereof, said bores extending entirely therethrough into the inner chamber of said support member;
(b) a reference electrode assembly positioned in one of said bores and an anode electrode assembly positioned in the second of said bores, each of said electrode assemblies having electroconductive surfaces exposed in said inner chamber, wherein each of said reference electrode and anode electrode assemblies is further characterized as comprising:
(1) a chemical resistant resilient insert member having a smooth bore axially positioned therein and extending entirely therethrough;
(2) an electroconductive rod slidably engaged in the bore in said insert member and having opposing threaded ends which protrude from each end of said insert member;
(3) an electroconductive electrode cap having a blind threaded bore engaged on the threaded end of the electroconductive rod protruding into said inner chamber from the insert member;
(4) a nut and washer assembly affixed to the threaded end of the electroconductive rod opposite to the engaged electrode cap and drawn up so as to expand the resilient insert member tightly against the wall of the bore in said support member thus providing a gas and liquid tight seal, and wherein the electroconductive electrode cap on said reference electrode is further characterized in that it has a chemical and erosive resistant open end jacket bonded about its periphery and exposing a portion of said cap in said inner chamber.

2. The device as defined in claim 1 wherein said anode electrode cap is constructed of platinum and said reference electrode cap is constructed of a noble metal having bonded about its periphery a chemical and erosive resistant open end jacket exposing a portion of said noble metal in said inner chamber.

References Cited

UNITED STATES PATENTS

| 2,450,459 | 10/1948 | Thomson | 324—30 |
| 2,525,754 | 10/1950 | Albrecht | 324—30 |
| 2,949,551 | 8/1960 | Sturgeon | 324—30 XR |
| 3,051,631 | 8/1962 | Harbin et al. | 204—195 XR |
| 3,199,949 | 8/1965 | Clerbois et al. | 324—30 XR |
| 3,234,562 | 2/1966 | Bell et al. | 204—195 XR |
| 3,334,039 | 8/1967 | Vlasak | 204—195 |

FOREIGN PATENTS 1,381,201  11/1964  France.

JOHN H. MACK, Primary Examiner

G. L. KAPLAN, Assistant Examiner

U.S. Cl. X.R.

204—1; 324—30